United States Patent
Combes et al.

(10) Patent No.: US 7,967,242 B2
(45) Date of Patent: Jun. 28, 2011

(54) ENGINE MOUNTING STRUCTURE INTERPOSED BETWEEN AN AIRCRAFT WING SYSTEM AND SAID ENGINE

(75) Inventors: Stephane Combes, Buzet sur Tarn (FR); Laurent Lafont, Pechbusque (FR)

(73) Assignee: AIRBUS France, Toulouse (FR)

( * ) Notice: Subject to any disclaimer, the term of this patent is extended or adjusted under 35 U.S.C. 154(b) by 497 days.

(21) Appl. No.: 12/065,837

(22) PCT Filed: Sep. 26, 2006

(86) PCT No.: PCT/EP2006/066736
§ 371 (c)(1),
(2), (4) Date: Mar. 5, 2008

(87) PCT Pub. No.: WO2007/036519
PCT Pub. Date: Apr. 5, 2007

(65) Prior Publication Data
US 2008/0237394 A1    Oct. 2, 2008

(30) Foreign Application Priority Data

Sep. 27, 2005    (FR) .................................... 05 52900

(51) Int. Cl.
*B64D 27/00*    (2006.01)
(52) U.S. Cl. ......................................... 244/54; 248/554
(58) Field of Classification Search ............... 244/54; 248/554–557; 60/796, 797
See application file for complete search history.

(56) References Cited

U.S. PATENT DOCUMENTS

| | | | | |
|---|---|---|---|---|
| 3,085,798 A | * | 4/1963 | Gavette | 269/17 |
| 3,327,965 A | * | 6/1967 | Bockrath | 244/54 |
| 4,560,122 A | * | 12/1985 | Parkinson et al. | 244/54 |
| 4,676,458 A | * | 6/1987 | Cohen | 244/58 |
| 4,717,095 A | * | 1/1988 | Cohen et al. | 244/58 |
| 5,065,959 A | * | 11/1991 | Bhatia et al. | 244/54 |
| 5,088,279 A | * | 2/1992 | MacGee | 60/226.1 |
| 5,467,941 A | | 11/1995 | Chee | |
| 5,524,847 A | | 6/1996 | Brodell et al. | |
| 5,746,391 A | * | 5/1998 | Rodgers et al. | 244/54 |
| 6,126,110 A | * | 10/2000 | Seaquist et al. | 244/54 |
| 6,474,597 B1 | * | 11/2002 | Cazenave | 244/54 |
| 7,063,290 B2 | * | 6/2006 | Marche | 244/54 |
| 7,232,091 B2 | * | 6/2007 | Marche | 244/54 |

FOREIGN PATENT DOCUMENTS
EP    1 103 463    5/2001

OTHER PUBLICATIONS

U.S. Appl. No. 12/067,192, filed Mar. 18, 2008, LaFont, et al.
U.S. Appl. No. 12/066,916, filed Mar. 14, 2008, Lafont.

\* cited by examiner

*Primary Examiner* — Joshua J Michener
*Assistant Examiner* — Joseph W Sanderson
(74) *Attorney, Agent, or Firm* — Oblon, Spivak, McClelland, Maier & Neustadt, L.L.P.

(57) ABSTRACT

A device for suspension of an engine, configured to be inserted between an aircraft wing and the engine. The device includes a rigid structure and a forward aerodynamic structure mounted fixed on the structure through a suspension mechanism. The forward aerodynamic structure is configured to carry engine fan casings and to be inserted between the rigid structure and the wing. The suspension mechanism includes at least one adjustable length connecting rod of which one end is mounted on the rigid structure, and the other end is mounted on the forward aerodynamic structure.

15 Claims, 3 Drawing Sheets

ENGINE MOUNTING STRUCTURE INTERPOSED BETWEEN AN AIRCRAFT WING SYSTEM AND SAID ENGINE

TECHNICAL DOMAIN

This invention relates to a device for suspension of an engine, designed to be inserted between an aircraft wing and the engine concerned, and an engine assembly comprising such a suspension device.

The invention may be used on any type of aircraft equipped with turbojets or turboprops.

This type of suspension device is also called an EMS (Engine Mounting Structure), and can be used to suspend a turbojet below the aircraft wing, or to mount this turbojet above this wing.

STATE OF PRIOR ART

Such a suspension device is designed to form the connection interface between a turbojet and a wing of the aircraft. It transmits forces generated by its associated turbojet engine to the structure of this aircraft, and it also enables routing of fuel, electrical, hydraulic and air systems between the engine and the aircraft.

In order to transmit forces, the suspension device comprises a rigid structure also called the primary structure, often of the "box" type, in other words formed by the assembly of upper and lower spars and lateral panels connected to each other through transverse ribs.

Furthermore, the device is provided with suspension means inserted between the turbojet engine and the rigid structure, these means globally comprising two engine suspensions, and a device to resist thrust forces generated by the turbo engine. In prior art, this load transfer device is usually in the form of two lateral connecting rods connected firstly to an aft part of the engine fan casing, and secondly to the aft attachment fixed to the engine central casing.

Similarly, the suspension device also comprises a mounting system composed of another series of suspensions inserted between the rigid structure and the aircraft wing, this system normally being composed of two or three suspensions.

Furthermore, the pylon is provided with a plurality of secondary structures assuring segregation and maintenance of systems while supporting aerodynamic fairing elements, these elements usually being in the form of panels added onto the structures. In a manner known to those skilled in the art, the secondary structures are differentiated from the rigid structure due to the fact that they are not designed to transfer forces from the engine to the aircraft wing.

Secondary structures include a forward aerodynamic structure inserted between the rigid structure and the aircraft wing, this forward aerodynamic structure having not only an aerodynamic fairing function, but also being useful for the placement, segregation and routing of different systems (air, electric, hydraulic, fuel). Furthermore, this forward aerodynamic structure also supports the associated engine fan casings, while the thrust inverter casings are usually carried by the rigid structure of the suspension pylon.

In solutions according to prior art, suspension means used for assembly of the forward aerodynamic structure on the rigid structure are usually complex, difficult to access and usually cannot be used to precisely adjust the position of the forward aerodynamic structure relative to the rigid structure.

Furthermore, these suspension means usually form a statically indeterminate structure which is not very desirable.

SUMMARY OF THE INVENTION

Therefore, the purpose of the invention is to propose a suspension device and an engine assembly comprising such a device overcoming the disadvantages mentioned above related to embodiments according to prior art.

To achieve this, the purpose of the invention is a device for suspension of an engine designed to be inserted between an aircraft wing and the engine, this device comprising a rigid structure and a forward aerodynamic structure coupled to this rigid structure through suspension means, the forward aerodynamic structure being designed to carry engine fan casings and to be inserted between the rigid structure and the wing. According to the invention, the suspension means comprise at least one adjustable length connecting rod, of which one end is mounted on the rigid structure and the other end is mounted on the forward aerodynamic structure.

Thus, the proposed invention is advantageous in that it presents one or several adjustable length connecting rods to mount the forward aerodynamic structure on the rigid structure of the suspension device. Therefore the above mentioned rods form a solution that is not very complex and can give a precise adjustment of the position of the forward aerodynamic structure relative to the rigid structure, this adjustment then being made as a function of the geometry required for the engine assembly. For example, the position of the forward aerodynamic structure can guarantee and control the position of fan fittings fixed to the fan casings, relative to the pylon/engine interface of the primary structure.

Furthermore, these connecting rods are easily accessible elements for an operator close to the suspension device, which facilitates operations to place and withdraw the forward aerodynamic structure.

Secondly, it should be noted that the presence of adjustable length connecting rods advantageously only very slightly limits access to the space between the rigid structure and the forward aerodynamic structure, in which equipment that must remain accessible to operators for placement or maintenance is normally located.

Finally, it should be noted that each connecting rod used is perfectly capable of resisting forces in a single preferred direction such that it is quite capable of forming a statically indeterminate mounting system in combination with other elements.

Preferably, the suspension means comprise two adjustable length connecting rods, each with one end connected to the rigid structure and another end fitted on the forward aerodynamic structure. In such a configuration, an assembly can then be made such that one of the two connecting rods is permanently active, in other words it participates in resisting forces passing between the two structures connected through the suspension means, and the other rod is only active in the case of a failure of the first rod. Thus, this final rod only performs a fail safe function, such that under normal conditions, it remains inactive and therefore it does not modify the statically indeterminate nature of the suspension means.

It can be arranged that the two adjustable length rods are arranged symmetrically about a vertical median plane of the suspension device, parallel to a longitudinal direction of this device. Furthermore, the ends of each adjustable length rod are preferably mounted so as to be articulated.

Also preferably, each adjustable length rod is arranged so as to form an angle of less of 20° with a vertical direction of the suspension device, which makes it quite appropriate to resist forces along this direction.

Furthermore, the suspension means comprise a beam inserted between the rigid structure and the forward aerodynamic structure, this beam then forming a complementary means to the rod, so as to form a statically indeterminate mounting system. This beam is preferably arranged along a direction transverse to the suspension device, for example over the entire width of this pylon. In this way, with this beam, it is possible to resist forces over the entire width of the suspension pylon, which advantageously means that forces are resisted better and that resistance forces at the interface are reduced.

It should also be noted that this beam, usually arranged on the upper spar of the box-shaped rigid structure, is easily accessible for an operator close to the suspension device, which facilitates operations to place and remove the forward aerodynamic structure.

Finally, it can be arranged that the beam is arranged to be aft from each adjustable length rod.

Another purpose of the invention is an engine assembly comprising an engine such as a turbojet and a suspension device for this engine, the suspension device being like that described above.

Other advantages and characteristics of the invention will become clear by reading the non-limitative detailed description given below.

BRIEF DESCRIPTION OF THE DRAWINGS

This description will be made with reference to the appended figures wherein.

DETAILED PRESENTATION OF PREFERRED EMBODIMENTS

Figure 1:
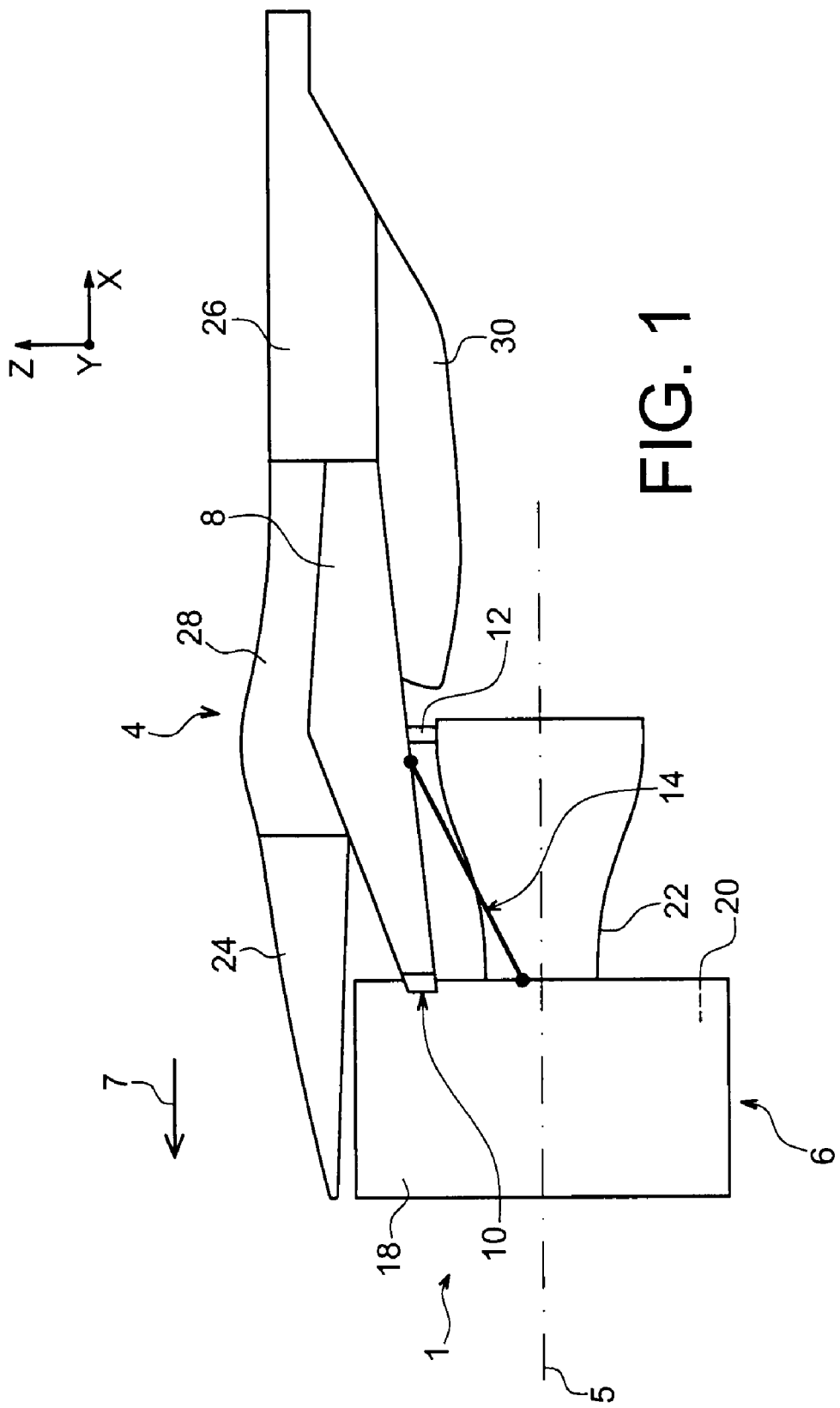
FIG. 1 shows a schematic side view of an aircraft engine assembly comprising a suspension device according to one preferred embodiment of this invention.

FIG. 1 shows an aircraft engine assembly 1 designed to be fixed under a wing of this aircraft (not shown), this assembly 1 comprising a suspension device 4 according to a preferred embodiment of this invention, and an engine 6 such as a turbojet suspended under this device 4.

Globally, the suspension device 4 comprises a rigid structure 8 also called the primary structure, provided with means of suspending the engine 6, these suspension means having a plurality of engine suspensions 10, 12 and a device for resisting thrust forces 14 generated by the engine 6.

For guidance, it should be noted that the assembly 1 is designed to be surrounded by a pod (not shown) and the suspension device 4 is fitted with another series of suspensions (not shown) added onto the rigid structure 8 and used to suspend this assembly 1 under the aircraft wing.

Throughout the following description, by convention X refers to the longitudinal direction of the device 4 that is also considered to be the same as the longitudinal direction of the turbojet 6, this X direction being parallel to a longitudinal axis 5 of this turbojet 6. Furthermore, the direction transverse to the device 4 is called the Y direction and can also be considered to be the same as the transverse direction of the turbojet 6, and Z is the vertical direction or the height, these three X, Y and Z directions being orthogonal to each other.

Furthermore, the terms <<forward>> and <<aft>> should be considered with respect to a direction of motion of the aircraft that occurs as a result of the thrust applied by the turbojet 6, this direction being shown diagrammatically by the arrow 7.

Therefore, in FIG. 1 the two engine suspensions 10, 12 can be seen with the thrust resistance device 14, the rigid structure 8 of the suspension device 4, and a plurality of secondary structures added onto the rigid structure 8. These secondary structures segregating and holding the systems while supporting aerodynamic fairing elements will be described below.

It should be noted that the turbojet 6 is provided with a large fan casing 18 in the forward end, delimiting an annular fan duct 20, and near the aft end comprises a smaller central casing 22 containing the heart of this turbojet. Casings 18 and 22 are obviously fixed to each other.

As can be seen in FIG. 1, there are two of the engine suspensions 10, 12 of the device 4, called the forward engine suspension and the aft engine suspension respectively.

In this preferred embodiment of this invention, the rigid structure 8 is in the form of a box extending from the aft part to the forward part, approximately along the X direction.

The box 8 is then in the form of a pylon with a design similar to that usually observed for turbojet suspension pylons, particularly in that it is provided with transverse ribs (not shown) each in the form of a rectangle arranged in a YZ plane.

The suspension means in this preferred embodiment comprise firstly the forward engine suspension 10 inserted between a forward end of the rigid structure 8 also called a pyramid, and an upper part of the fan casing 18. The forward engine suspension 10 is designed conventionally in a manner known to those skilled in the art.

Furthermore, the aft engine suspension 12, also made conventionally in a manner known to those skilled in the art, is inserted between the rigid structure 8 and the central casing 22.

Also with reference to FIG. 1, the secondary structures of the pylon 4 include a forward aerodynamic structure 24, an aft aerodynamic structure 26, a connection fairing 28 of the forward and aft aerodynamic structures and a lower aft aerodynamic fairing 30.

Globally, these secondary structures are conventional elements identical to or similar to those used in prior art, and known to those skilled in the art.

More precisely, the forward aerodynamic structure 24 is placed under the wing and above the primary structure 8. It is coupled to the rigid structure 8, and has an aerodynamic profile function between an upper part of the fan casings hinged on it and the leading edge of the wing. This forward aerodynamic structure 24 then not only performs an aerodynamic fairing function, but it is also used for segregation and for routing different systems (air, electrical, hydraulic, fuel). Furthermore, since the forward part of this structure 24 is not in contact with the rigid structure 8, a heat exchanger is usually inserted in the space defined between these two elements.

The connection fairing 28, also called the "karman", is directly in line with this structure 24 and aft from it, always under the wing and installed above the rigid structure 8. The connection fairing 28 is then extended in the aft direction by the aft aerodynamic structure 26 that contains most of the hydraulic equipment. This structure 26 is preferably located entirely aft from the rigid structure 8, and is therefore attached under the aircraft wing.

Finally, the lower aft aerodynamic fairing 30, also called shield or Aft Pylon Fairing, is also located under the rigid structure 8 and the aft aerodynamic structure 26. Its essential functions are the formation of a fire resistant barrier and the formation of aerodynamic continuity between the engine exhaust and the suspension pylon.

Figure 2:
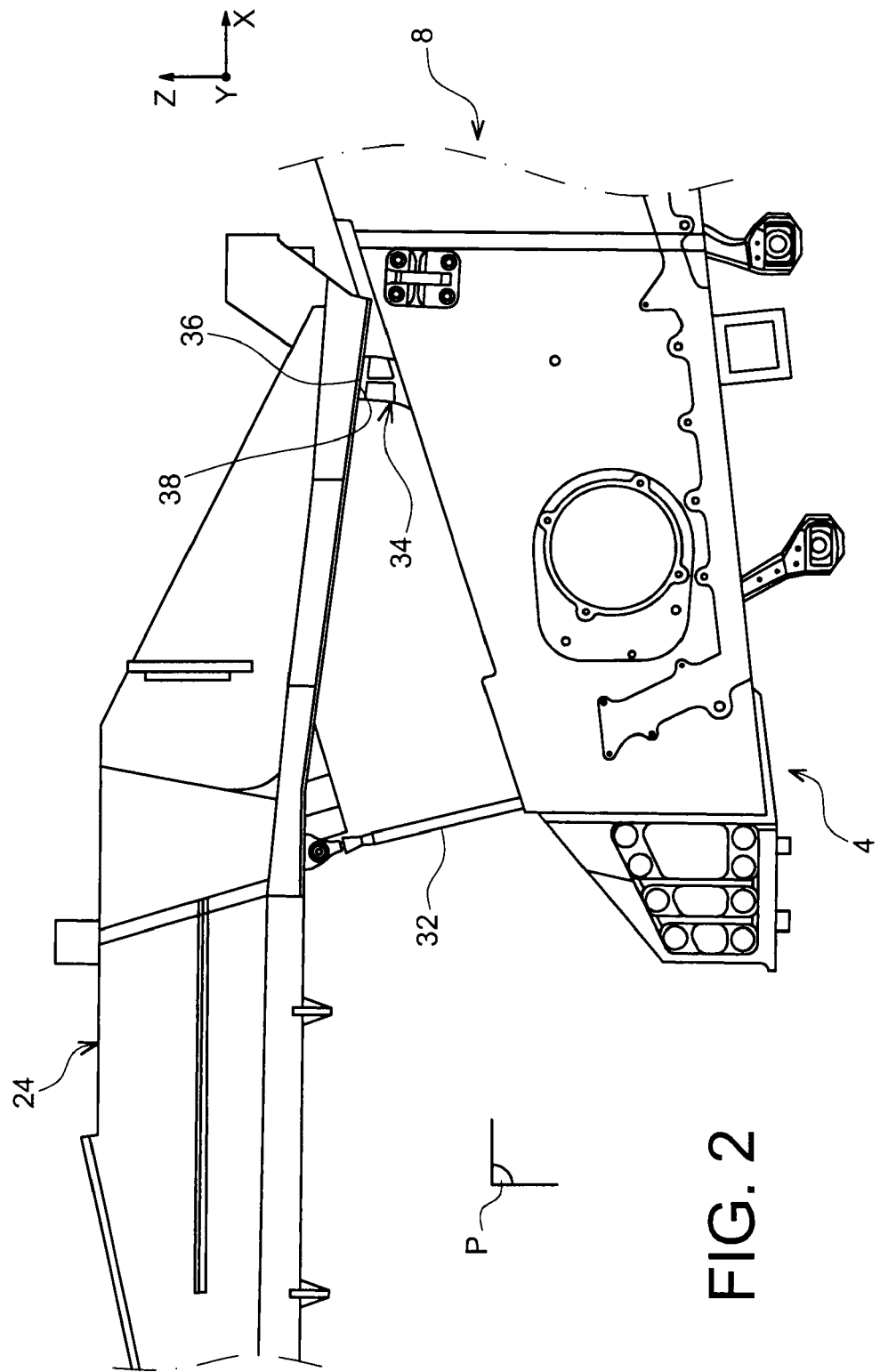
FIG. 2 shows a detailed partial view of the suspension device forming part of the engine assembly shown in FIG. 1.
Figure 3:
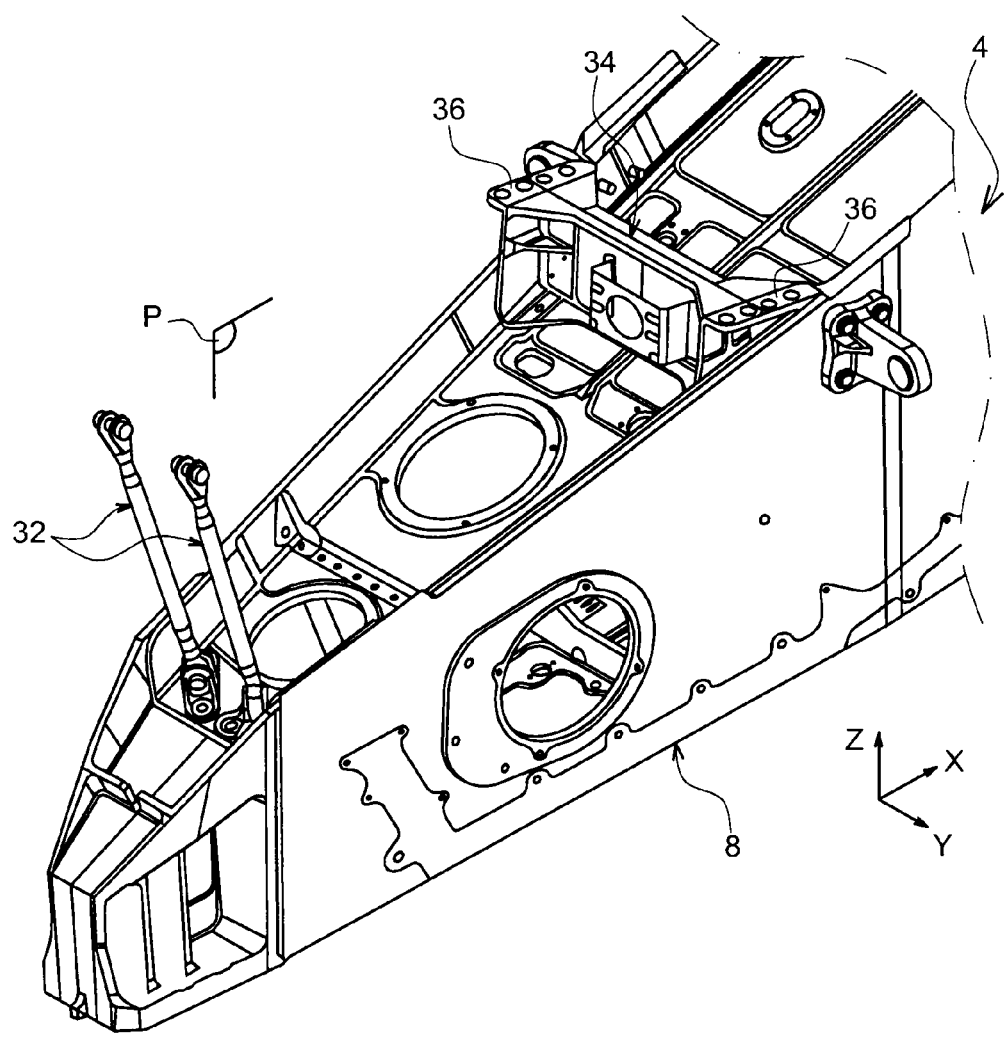
FIG. 3 shows a partial enlarged perspective view of the suspension device shown in FIG. 2.

Now with reference to FIGS. 2 and 3, the figures show means of suspension of the forward aerodynamic structure 24 onto the rigid structure 8.

Firstly, these means include two adjustable length connecting rods 32 arranged symmetrically about a median vertical plane P of the suspension device, parallel to the X direction. It should be noted that this same plane P forms a plane of symmetry for the rigid structure 8, in a known manner.

The lower end of each rod 32 is connected articulated onto the upper spar of the box-shaped rigid structure 8, while the lower end of each rod 32 is connected articulated to a lower spar of the forward aerodynamic structure 24. The rods 32 are connected at a forward end part of the rigid structure 8, and are preferably inclined at an angle of less than 20° from the Z direction, preferably so that the distance between it and the forward aerodynamic structure 24 reduces in the forward direction, as shown in FIG. 2.

Therefore, the rods are designed so that their length can be adjusted. In this respect, any type of rod known to those skilled in the art capable of performing this adjustable length function may be used. In particular, rods may be used for which one or both ends can be displaced with respect to the body of the rod, by any known mechanical system. The rods may also be made in two approximately identical parts each with one end, and for which the length over which these two parts are nested controls the total length of the rod.

The fact that the length of the rods 32 can be adjusted makes it possible firstly to precisely adjust the position of the forward aerodynamic structure 24 with respect to the rigid structure 8, and with respect to any other element of the engine assembly. This also makes it easy to set up a differentiated assembly between the two rods 32, such that one of them is permanently active, in other words it participates in resisting forces passing between the two structures 24 and 8, and the other rod is active only if the first rod should fail. Thus, this second rod performs only a backup function called the "fail safe" function, such that under normal condition it does not transmit forces between the two structures 24 and 8.

In this case, the active rod 32 is designed to resist forces applied principally along the Z direction, but not forces applied along the X and Y directions.

Means of suspension of the structure 24 on the structure 8 associated with these rods 32, also include a beam 34 oriented along the Y direction and preferably extending over the entire width of the upper spar of the rigid structure onto which it is installed fixed.

As can be better seen in FIG. 3, this beam 34 is preferably doubled up for safety reasons, in other words it is formed by two beams superposed along the X direction. It is provided with an attachment interface 36 at each of its two ends, designed to hold an attachment interface 38 provided on the structure 24.

More precisely, it can be seen that each attachment half-interface 36 is preferably in the form of an approximately plane surface extending along an XY plane slightly above the upper spar of the box-shaped structure 8. Once the interfaces 36, 38 are in contact, they are fixed to each other through bolts or similar elements.

The beam 34 is on the aft side of the rods 32 and cooperates with an aft end part of the structure 24, as can be seen in FIG. 2.

With such a design, the beam 34 is then designed to resist forces applied mainly along the transverse Y direction, and its design is therefore preferably of the type with two "half attachment interfaces", in which each of these two half interfaces 36 is capable of resisting forces applied mainly along the X direction and along the vertical Z direction.

In this way, forces applied along the longitudinal X direction and along the Y direction are resisted exclusively by the two half attachment interfaces of the beam 34, and forces applied along the vertical Z direction are resisted jointly by the active rod 32 and by the two half attachment interfaces of the beam 34.

Furthermore, the moments applied about the X direction and about the Z direction are resisted solely by the two half-attachment interfaces of the beam 34, while moments applied about the Y direction are resisted vertically jointly by these two half interfaces and the active rod 32.

Therefore the suspension means 34, 36 that have been described above can form a statically indeterminate system for assembly of the forward aerodynamic structure 24 on the rigid structure 8 of the pylon 4.

Obviously, those skilled in the art can make various modifications to the suspension device 4 and to the engine assembly 1 that have just been described, solely as non-limitative examples. In this respect, for example, it is worth mentioning that although the engine assembly 1 has been presented in a configuration suitable for it to be suspended under the aircraft wing, this assembly 1 could also be presented in a different configuration in which it could be mounted above this wing.

The invention claimed is:

1. A suspension device for suspension of an engine, configured to be inserted between an aircraft wing and the engine, the suspension device comprising:
   a rigid structure; and
   a forward aerodynamic structure coupled to the rigid structure through suspension means, the forward aerodynamic structure being configured to carry an engine fan casing and to be inserted between the rigid structure and the wing,
   wherein the suspension means includes at least one adjustable length connecting rod of which one end is mounted on the rigid structure, and the other end is mounted on the forward aerodynamic structure, and
   wherein said at least one adjustable length connecting rod has one end connected to a forward end of an upper spar of said rigid structure and another end connected to a lower spar of said forward aerodynamic structure.

2. A suspension device for suspension of an engine according to claim 1, wherein the suspension means includes two adjustable length connecting rods, each having one end mounted on the rigid structure, and the other end mounted on the forward aerodynamic structure.

3. A suspension device for suspension of an engine according to claim 2, wherein the two adjustable length connecting rods are arranged symmetrically about a vertical median plane of the suspension device, the vertical median plane being parallel to a longitudinal direction of the suspension device.

4. A suspension device for suspension of an engine according to claim 1, wherein the ends of each adjustable length rod are mounted so as to be articulated.

5. A suspension device for suspension of an engine according to claim 1, wherein each adjustable length rod is arranged so as to form an angle of less of 20° with a vertical direction of the suspension device.

6. A suspension device for suspension of an engine according to claim 1, wherein the suspension means further comprises a beam inserted between the rigid structure and the forward aerodynamic structure.

7. A suspension device for suspension of an engine according to claim 6, wherein the beam is arranged along a transverse direction of the suspension device.

8. A suspension device for suspension of an engine according to claim 7, wherein the beam is arranged to be aft from each adjustable length rod.

9. A suspension device for suspension of an engine according to claim 6, wherein the beam is arranged to be aft from each adjustable length rod.

10. A suspension device for suspension of an engine according to claim 1, wherein said suspension means further comprises an aft suspension device having an end connected to said rigid structure at a location aft from said forward end and another end connected to an aft end of said forward aerodynamic structure.

11. A suspension device for suspension of an engine according to claim 1, wherein said at least one adjustable length connecting rod is configured to adjust a position of said forward aerodynamic structure relative to said rigid structure.

12. A suspension device for suspension of an engine according to claim 1, wherein the at least one adjustable length connecting rod includes one end directly mounted on the rigid structure, and includes the other end directly mounted on the forward aerodynamic structure.

13. An engine assembly comprising:
an engine; and
a suspension device for suspension of an engine, wherein the suspension device is a suspension device according to claim 1.

14. An engine assembly comprising:
an engine fan casing; and
a suspension device for suspension of an engine, wherein the suspension device is a suspension device according to claim 1.

15. A suspension device for suspension of an engine, configured to be inserted between an aircraft wing and the engine, the suspension device comprising:
a rigid structure; and
a forward aerodynamic structure coupled to the rigid structure through suspension means, the forward aerodynamic structure being configured to carry an engine fan casing and to be inserted between the rigid structure and the wing,
wherein the suspension means includes at least one adjustable length connecting rod of which one end is mounted on the rigid structure, and the other end is mounted on the forward aerodynamic structure, and
wherein said at least one adjustable length connecting rod includes two adjustable length connecting rods, a first adjustable length connecting rod being an active connection configured to resist forces passing between the rigid structure and the forward aerodynamic structure under normal conditions, while a second adjustable length connecting rod is a fail safe connection that under said normal conditions does not transmit forces between the rigid structure and the forward aerodynamic structure.

* * * * *